(12) United States Patent
Amble et al.

(10) Patent No.: US 11,936,602 B2
(45) Date of Patent: Mar. 19, 2024

(54) ENHANCED INSTANT MESSAGE HANDLING AND DELIVERY

(71) Applicant: International Business Machines Corporation, Armonk, NY (US)

(72) Inventors: Vinai S. Amble, San Francisco, CA (US); Nicholas M. Augustyniak, Seattle, WA (US); Edwin J. Bruce, Corinth, TX (US); Romelia H. Flores, Keller, TX (US); Lemnyuy B. Nyuykongi, Coppell, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 16/275,336

(22) Filed: Feb. 14, 2019

(65) Prior Publication Data
US 2019/0182189 A1   Jun. 13, 2019

Related U.S. Application Data

(63) Continuation of application No. 14/946,380, filed on Nov. 19, 2015, now Pat. No. 10,230,671.

(51) Int. Cl.
*H04L 51/066* (2022.01)
*H04L 51/04* (2022.01)
(Continued)

(52) U.S. Cl.
CPC ............ *H04L 51/066* (2013.01); *H04L 51/04* (2013.01); *H04L 67/306* (2013.01); *H04L 51/214* (2022.05)

(58) Field of Classification Search
CPC ..... H04L 51/04; H04L 51/043; H04L 67/306; H04L 67/22
See application file for complete search history.

(56) References Cited

U.S. PATENT DOCUMENTS 6,865,384 B2 * 3/2005 Sagi ................... H04M 3/42382
                                                            455/433
7,363,345 B2 * 4/2008 Austin-Lane ......... H04L 67/535
                                                            709/224
(Continued)

FOREIGN PATENT DOCUMENTS

CN          103888346 A   *  6/2014   ........... G08B 3/1008
EP            2900016 A1  *  7/2015   ............ H04W 36/04
(Continued)

OTHER PUBLICATIONS

IBM: List of IBM Patents or Patent Applications Treated as Related, 2 pg.

(Continued)

*Primary Examiner* — Shean Tokuta
(74) *Attorney, Agent, or Firm* — CUENOT, FORSYTHE & KIM, LLC

(57) ABSTRACT

Managing instant message delivery may include receiving, using a processor, an instant message, wherein the instant message is directed to a recipient, and responsive to receiving the instant message, determining, using the processor, a user profile for the recipient and an activity level of a client device of the recipient. The user profile may specify rules for delivering instant messages to the recipient from users. Responsive to receiving the instant message, a delivery policy for the instant message may be determined using the processor according to the user profile of the recipient and the activity level of the client device. The instant message may be sent to the client device of the recipient according to the delivery policy using the processor.

15 Claims, 5 Drawing Sheets

(51) Int. Cl.
*H04L 67/306* (2022.01)
*H04L 51/214* (2022.01)

(56) References Cited

U.S. PATENT DOCUMENTS

| | | | | |
|---|---|---|---|---|
| 7,472,163 | B1* | 12/2008 | Ben-Yoseph | H04L 51/212 |
| | | | | 709/206 |
| 7,720,916 | B2 | 5/2010 | Fisher | |
| 7,730,143 | B1* | 6/2010 | Appelman | H04W 4/12 |
| | | | | 709/204 |
| 7,764,772 | B2* | 7/2010 | Weksel | H04M 3/53366 |
| | | | | 379/88.13 |
| 7,882,195 | B2 | 2/2011 | Kirkland | |
| 8,090,777 | B2 | 1/2012 | Daniels-Farrar | |
| 8,166,119 | B2* | 4/2012 | Ligh | G06F 3/04886 |
| | | | | 715/810 |
| 8,244,810 | B1* | 8/2012 | Haldar | H04L 51/04 |
| | | | | 709/206 |
| 8,412,786 | B2 | 4/2013 | Reeves | |
| 8,880,627 | B2* | 11/2014 | Davenport | H04L 51/56 |
| | | | | 709/204 |
| 9,253,210 | B2* | 2/2016 | Muppidi | H04W 12/086 |
| 9,876,744 | B2* | 1/2018 | Liu | H04L 51/04 |
| 10,230,671 | B2 | 3/2019 | Amble et al. | |
| 11,777,890 | B2* | 10/2023 | Gulik | H04L 51/216 |
| | | | | 709/206 |
| 2004/0154022 | A1* | 8/2004 | Boss | H04L 51/212 |
| | | | | 719/310 |
| 2007/0143472 | A1* | 6/2007 | Clark | H04L 67/535 |
| | | | | 709/224 |
| 2007/0226309 | A1 | 9/2007 | Bell, III | |
| 2007/0288580 | A1* | 12/2007 | Kaminsky | H04L 51/04 |
| | | | | 709/206 |
| 2008/0028031 | A1* | 1/2008 | Bailey | G06Q 10/10 |
| | | | | 709/206 |
| 2008/0162642 | A1* | 7/2008 | Bachiri | H04L 67/306 |
| | | | | 709/206 |
| 2009/0182822 | A1 | 7/2009 | O'Sullivan | |
| 2009/0192970 | A1 | 7/2009 | O'Sullivan | |
| 2010/0250692 | A1* | 9/2010 | Kaminsky | H04L 51/04 |
| | | | | 709/206 |
| 2010/0332602 | A1* | 12/2010 | O'Sullivan | G06Q 10/107 |
| | | | | 709/206 |
| 2014/0143202 | A1* | 5/2014 | Rekula | G06Q 10/107 |
| | | | | 707/610 |
| 2014/0207883 | A1* | 7/2014 | Castellucci | H04L 51/04 |
| | | | | 709/206 |
| 2014/0214973 | A1* | 7/2014 | DeLuca | H04L 51/226 |
| | | | | 709/206 |
| 2014/0282003 | A1* | 9/2014 | Gruber | G06F 3/165 |
| | | | | 715/727 |
| 2014/0282606 | A1* | 9/2014 | Clark | G06F 9/4843 |
| | | | | 718/107 |
| 2014/0321366 | A1* | 10/2014 | Wischhof | H04L 67/62 |
| | | | | 370/328 |
| 2015/0066798 | A1* | 3/2015 | Gillen | G06Q 30/0251 |
| | | | | 705/336 |
| 2015/0100644 | A1* | 4/2015 | Gulik | H04L 51/216 |
| | | | | 709/206 |
| 2015/0215241 | A1* | 7/2015 | Zhou | H04L 51/216 |
| | | | | 709/206 |
| 2015/0242847 | A1* | 8/2015 | Erdelyi | G06Q 20/10 |
| | | | | 705/14.33 |
| 2015/0256977 | A1* | 9/2015 | Huang | H04W 4/029 |
| | | | | 455/456.3 |
| 2016/0086241 | A1* | 3/2016 | Proulx | G06F 3/0481 |
| | | | | 705/26.4 |
| 2016/0150040 | A1* | 5/2016 | Fan | H04L 67/14 |
| | | | | 709/217 |
| 2017/0149706 | A1* | 5/2017 | Amble | H04L 51/066 |

FOREIGN PATENT DOCUMENTS

| | | | | |
|---|---|---|---|---|
| JP | 2012181599 A | * | 9/2012 | |
| KR | 20140098720 A | * | 8/2014 | |
| WO | WO-2017054581 A1 | * | 4/2017 | G06F 11/36 |

OTHER PUBLICATIONS

Amble, V. et al., "Enhanced Instant Message Handling and Delivery", U.S. Appl. No. 14/946,380, filed Nov. 19, 2015, 32 pages.

Bazinette, V., et al. "An Intelligent Notification System," IBM Research Technical Report RC 22089 (99042), Thomas J. Watson Research Center, Jun. 12, 2001, 16 pg.

* cited by examiner

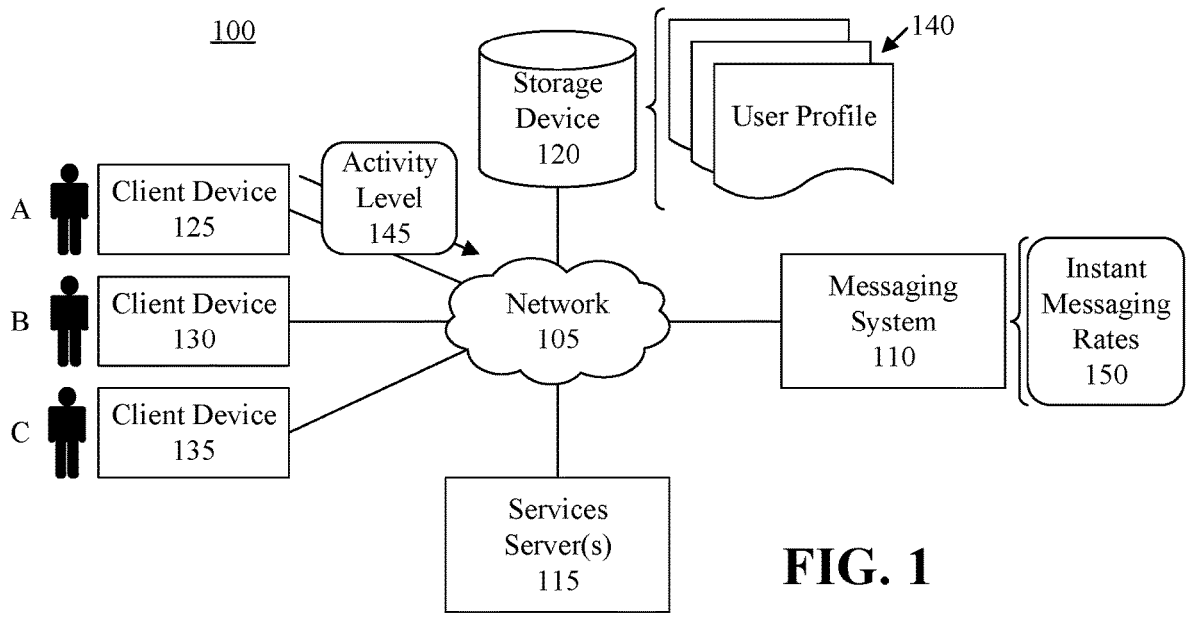
FIG. 1
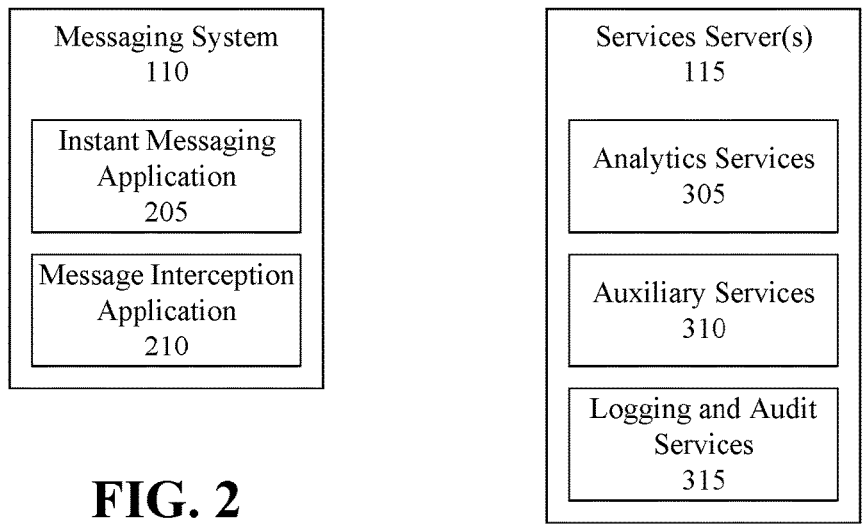
FIG. 2
FIG. 3

ENHANCED INSTANT MESSAGE HANDLING AND DELIVERY

BACKGROUND

This disclosure relates to instant messaging and, more particularly, to delivery and handling of instant messages. Instant messaging has become widely adopted across both work and personal environments. The ability of a user to quickly initiate an instant messaging session with another user or to participate in group chats has elevated the importance of instant messaging within many organizations. Many users rely extensively on instant messaging for communicating with other users and often favor instant messaging over other forms of communication such as electronic mail.

The success of instant messaging as a collaborative tool has led to situations where users are inundated with instant messages. A recipient may receive a large volume of instant messages from a single sender or from a variety of different senders. As instant messages begin to "stack up" in one's client device, keeping pace with potentially several and different ongoing instant messaging conversations becomes difficult, time consuming, and potentially distracting. In some cases, the collaborative benefits initially attained through the use of instant messaging may be lost.

SUMMARY

An embodiment of the present invention may include a method of managing instant message delivery. The method may include receiving, using a processor, an instant message, wherein the instant message is directed to a recipient, and, responsive to receiving the instant message, determining, using the processor, a user profile for the recipient and an activity level of a client device of the recipient. The user profile may specify rules for delivering instant messages to the recipient from users. Responsive to receiving the instant message, a delivery policy for the instant message may be determined using the processor according to the user profile of the recipient and the activity level of the client device. The instant message may be sent to the client device of the recipient according to the delivery policy using the processor.

Another embodiment may include a system for managing instant message delivery. The system may include a processor programmed to initiate executable operations. The executable operations may include receiving an instant message, wherein the instant message is directed to a recipient, and, responsive to receiving the instant message, determining a user profile for the recipient and an activity level of a client device of the recipient. The user profile may specify rules for delivering instant messages to the recipient from users. The executable operations may also include, responsive to receiving the instant message, determining a delivery policy for the instant message according to the user profile of the recipient and the activity level of the client device. The executable operations further may include sending the instant message to the client device of the recipient according to the delivery policy.

A computer program may include a computer readable storage medium having program code stored thereon. The program code is executable by a processor to perform a method of managing instant message delivery. The method may include receiving, using a processor, an instant message, wherein the instant message is directed to a recipient, and, responsive to receiving the instant message, determining, using the processor, a user profile for the recipient and an activity level of a client device of the recipient. The user profile may specify rules for delivering instant messages to the recipient from users. Responsive to receiving the instant message, a delivery policy for the instant message may be determined using the processor according to the user profile of the recipient and the activity level of the client device. The instant message may be sent to the client device of the recipient according to the delivery policy using the processor.

BRIEF DESCRIPTION OF THE DRAWINGS

FIG. 1 is a block diagram illustrating an example of a network data processing system.

FIG. 2 is a block diagram illustrating an exemplary software architecture for a messaging system.

FIG. 3 is a block diagram illustrating an exemplary software architecture for a services server.

DETAILED DESCRIPTION

Figure 4:
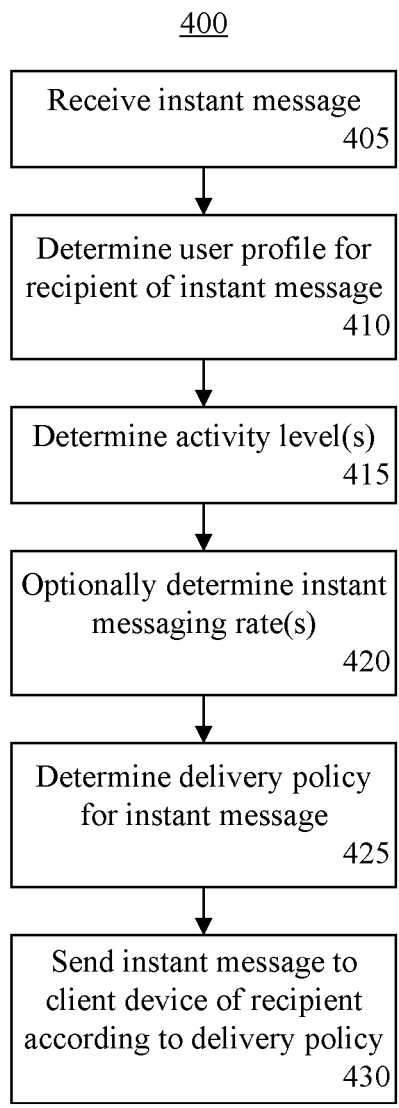
FIG. 4 is a flow chart illustrating an exemplary method of instant message handling and delivery.

This disclosure relates to instant messaging and, more particularly, to delivery and handling of instant messages. In accordance with the inventive arrangements described within this disclosure, the delivery of instant messages to a client device of a recipient may be throttled according to a variety of different factors. The throttling of instant messages allows the instant message recipient to regulate the flow of instant messages to his or her client device in a manner that may preserve the conversational context intended by the sender of the instant messages. In addition, the flow of instant messages, as received by the recipient client device, may be varied so that instant messages are received at more convenient times for the recipient.

FIG. 1 is a block diagram illustrating an example of a network data processing system 100 in which the inventive arrangements may be implemented. Network data processing system 100 contains a network 105. Network 105 is the medium used to provide communications links between various devices and data processing systems connected together within network data processing system 100. Network 105 may include connections, such as wire, wireless communication links, or fiber optic cables. Network 105 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

In the depicted example, a messaging system 110 and one or more services server(s) 115 (hereafter "server 115") may couple to network 105 along with a storage device 120. In addition, client devices (clients) 125, 130, and 135 may couple to network 105. Clients 125, 130, and 135 may be, for example, personal computers, portable devices, network computers, tablet computers, mobile phones, or the like. Messaging system 110 may be implemented as one or more data processing systems, e.g., servers, executing suitable operational software to support instant messaging among clients 125, 130, and 135. Clients 125, 130, and 135 may communicate with messaging system 110 in order to exchange instant messages among one another. Messaging system 110 may perform operations such as instant message handling and delivery as described herein. Within this disclosure, the term "instant messaging," or derivatives thereof, refers to instant messaging, text messaging, Short Message Service (SMS) communications, or other forms of messaging that provide real time or near real time communication.

Server 115 may execute one or more services. For example, server 115 may execute analytics services, auxiliary services, and logging and audit services to be described herein in greater detail. Messaging system 110 may call or invoke the various services provided by server 115. Storage device 120 may store a plurality of user profiles 140. Each user profile 140 may specify one or more rules for handling and delivery of instant messages for a particular user. In one aspect, the rules specify different handling operations according to the sender of the instant message(s) or a group to which the sender may belong. Further, user profiles 140 may specify interactions and/or priority among a plurality of different factors relating to the sender of an instant message, the role of the sender of an instant message within an organization, an activity level of the client of the recipient of an instant message, an activity level of the client of the sender of an instant message, an instant messaging rate at which instant messages are received by the client of a user (with respect to a particular sender or across multiple or all senders in a given amount of time), and/or an instant messaging rate at which instant messages are sent by the client of a user (to a particular recipient or to multiple recipients or to all recipients in a given amount of time).

In one exemplary implementation, the rules of a user profile 140 specify a delivery policy, which may be sender and/or sender group specific. The delivery policy, for example, may be specified by the rules of the user profile and implemented by interpreting and/or executing the rules using the various factors described herein including, but not limited to, activity level, instant messaging rate, and the like, which may be determined in real time, updated periodically, from time-to-time, or the like.

As pictured, client 125 may send an activity level 145 to messaging system 110. In one aspect, the instant messaging application in client 125 may determine activity level 145 and send activity level 145 to messaging system 110. Client 125 may send the activity level from time to time, periodically, or responsive to a request from messaging system 110 and/or server 115. As defined within this disclosure, the term "activity level" means a list of applications currently executing on a client. In another aspect, an activity level may specify whether an instant messaging application, if executing on the client, has focus. In one example, the activity level of a client device may be quantified and expressed as a numeric value or score representing the number of applications currently being executed by the client. In one aspect, the activity level may be decreased responsive to determining that the instant messaging application of the recipient's client device has focus. The activity level may be decreased in that case since the recipient may be more likely to respond to a received instant message with the instant messaging application in focus. Similarly, the activity level may be increased responsive to determining that the instant messaging application of the recipient's client device does not have focus. While illustrated for client 125, it should be appreciated that an activity level may be sent from each of clients 125, 130, and/or 135 to messaging system 110 as described.

Messaging system 110 may perform handling and delivery of instant messages among client devices 125, 130, and 135. In doing so, messaging system 110 may calculate instant messaging rates 150 for different ones of clients 125, 130, and/or 135. As defined within this specification, the term "instant messaging rate" is the rate at which instant messages are sent or received by a client device. In this regard, an instant messaging rate may be an incoming instant messaging rate or an outgoing instant messaging rate. Accordingly, the instant messaging rate specifies the number of instant messages sent and/or received over a given period of time. In one aspect, instant messaging rates 150 may be calculated on an ongoing basis for the last 10 minutes, last 5 minutes, last 1 minute, or most recent number of seconds for a given user, e.g., as a running average per unit time.

In one exemplary arrangement, user B of client 130 may send an instant message from client 130 to user A at client 125. Thus, user B is the sender and user A is the recipient of the instant message. The instant message may be received by messaging system 110 from client 130 for handling and delivery. In response to receiving the instant message, messaging system 110 may access one or more services from server 115 that may be used to process the instant message, may retrieve and read user profile 140 of user A, may determine an activity level 145 of client 125 and/or client 130, and determine the instant messaging rate 150 (e.g., incoming and/or outgoing) for client 125 and/or client 130. Based upon the aforementioned factors, messaging system 110 may determine a delivery policy for the instant message and send the instant message to client 125 in accordance with the determined delivery policy.

FIG. 1 is provided for purposes of illustration and is not intended to limit the inventive arrangements described herein. It should be appreciated that network data processing system 100 may include fewer elements than shown or more elements such as additional servers, clients, and other devices.

FIG. 2 is a block diagram illustrating an exemplary software architecture for messaging system 110. As pictured, messaging system 110 may include an instant messaging application 205 and a message interception application 210. Instant messaging application 205 may provide standard instant messaging functions as executed by messaging system 110. Message interception application 210 may be an application that executes in cooperation with instant messaging application 205. In one embodiment, message interception application 210 may augment the instant messaging processing path of instant messaging application 205 to perform additional operations such as instant message pacing, queueing, manipulation, consolidation (combining), and filtering of instant messaging traffic passing through message interception application 210.

Instant messaging application 205 and/or message interception application 210 may access data stores that may be maintained within messaging system 110, within storage device 120, and/or within another server. For example, while not illustrated, instant messaging application 205 may access messaging operational data. Messaging operational data may include in-transit and working data for instant messaging application 205. Similarly, while not shown, message interception application 210 may access message interception working and persistence data. Message interception working and persistence data may include interim storage of inhibited, manipulated, and/or combined instant messages.

FIG. 3 is a block diagram illustrating an exemplary software architecture for server 115. As pictured, server 115 may include analytics services 305, auxiliary services 310, and logging and audit services 315. Analytics services 305 may utilize models, patterns, and rules for measuring user activity, content relationships, throughput decisions, and system performance. In another aspect, analytics services 305 may include an inference engine to analyze instant message content. Auxiliary services 310 may perform natural language processing, content policy application and enforcement, and institutional guidelines and standards enforcement. Logging and audit services 315 may include the capture of original instant messages (e.g., original instant messaging content), which may be stored in association with any altered instant messaging content, delivery statistics, system performance and throughput metrics, policies that have been applied, decisions made by the instant messaging application 205 and/or message interception application 210, instant message routings implemented, and/or other dispositions.

Analytics services 305, auxiliary services 310, and/or logging and audit services 315 may be callable from other components such as messaging application 205 and/or message interception application 210. Further, analytics services 305, auxiliary services 310, and/or logging and audit services 315 may be callable from among one another. Analytics services 305, auxiliary services 310, and/or logging and audit services 315 may access data stores that may be maintained within server 115, within storage device 120, and/or within another server. For example, while not illustrated, analytics services 305 may access analytics and modeling reference data; auxiliary services 310 may access natural language reference and policy compliance data; and logging and audit services 315 may access logs and journaling data. Analytics modeling and reference data may be a repository for models, patterns, and rules associated with analytical operations called from other components. Natural language reference and policy compliance data may include reference data for natural language processing lookup, traffic content, security and appropriateness enforcement, and the like. Logs and journaling data may include indexed, searchable, and correlate-able records of original and altered instant message traffic pertaining to the instant messaging handling and delivery operations described herein. In one aspect, logs and journaling data may include metrics relating to functional operations and performance of augmentation.

FIG. 4 is a flow chart illustrating an exemplary method 400 of instant message handling and delivery. Method 400 may be performed by a system as described with reference to FIG. 1. In one arrangement, method 400 may be performed by messaging system 110.

In block 405, the system may receive an instant message. The instant message may specify users such as a sender and a recipient. In this regard, the system is aware of the sender and recipient. In block 410, responsive to receiving the instant message, the system may determine and/or retrieve a user profile for the recipient of the instant message.

In block 415, the system may determine one or more activity levels. In one arrangement, the system may determine the activity level of the client device of the recipient and/or the activity level of the client device of the sender. In block 420, the system may optionally determine one or more instant messaging rates. As discussed, the system may determine an incoming instant messaging rate and/or an outgoing instant messaging rate. The system may determine the instant messaging rates for the client device of the sender and/or for the client device of the recipient.

In block 425, the system may determine a delivery policy for the instant message. In some cases, depending upon the particular delivery policy that is determined, the delivery policy may apply not only to the received instant message, but also to one or more additional instant messages that may subsequently be received from the same sender that are directed to the same recipient. In block 430, the system may send the instant message to the client device of the recipient according to the delivery policy.

Figure 5:
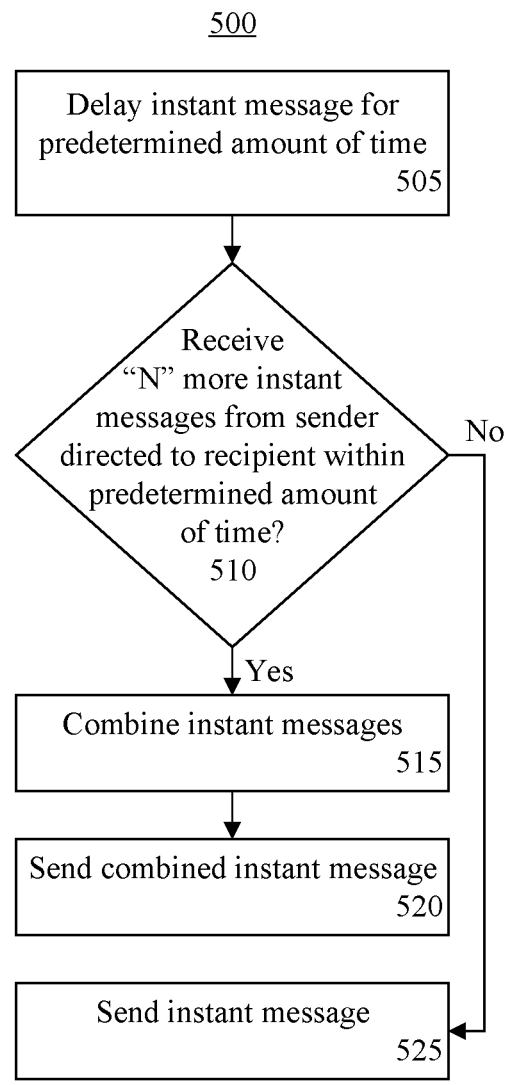
FIG. 5 is a flow chart illustrating another exemplary method of instant message handling and delivery.

FIG. 5 is a flow chart illustrating another exemplary method 500 of instant message handling and delivery. More particularly, method 500 illustrates the implementation of a particular delivery policy as determined by the messaging system. Method 500 illustrates an example where received instant messages may be delayed to determine whether further instant messages directed to the recipient are received from the same sender. The messages may also be combined.

In one example, a user profile of a recipient of an instant message may indicate that instant messages received from a particular sender may be delayed for a predetermined amount of time. The predetermined amount of time may be as small as one, two, three or more seconds. As an example, the sender listed in the user profile may frequently send several instant messages in rapid succession making it more difficult for the recipient to respond. Further, the user profile may indicate that the instant messages should be combined.

In another example, the user profile may indicate that instant messages received from a particular sender may be delayed for the predetermined amount of time, but only when the activity level of the recipient's client device is at or above a threshold level. In still another example, the user profile may indicate that instant messages received from a particular sender may be delayed for the predetermined amount of time, but only when the incoming instant messaging rate of the recipient's client device is at or above a threshold rate. In this case, the system determines that the recipient is already engaged in one or more instant messaging collaborations and is not able to participate in any further instant messaging collaborations. In yet another example, the user profile may indicate that instant messages received from a particular sender may be delayed for the predetermined amount of time, but only when the incoming instant messaging rate of the recipient's client device is at or above the threshold rate and/or the activity level of the recipient's client device is at or above the threshold level.

Accordingly, method 500 may begin in a state where the system has received an instant message from a sender directed to a recipient. The system has retrieved the user profile for the recipient and determined that the sender is listed therein with specified instant messaging handling. The user profile for the recipient further may list one or more of the various thresholds described herein with reference to activity level and/or instant messaging rate. The system has determined that delaying the received instant message and potentially combining multiple instant messages is the appropriate delivery policy.

In block 505, having received an instant message from a particular sender, the system may delay the instant message for a predetermined amount of time. The predetermined amount of time may be 2 minutes, 1 minute, seconds (less than a minute), or the like. In block 510, the system may determine whether "N" more instant messages from the sender have been received for the recipient within the predetermined amount of time. In this example, "N" is an integer value of 1 or more. Further, the value of "N" may be specified in the user profile.

If the system determines that N more instant messages from the sender to the recipient have been received within the predetermined amount of time, method 500 may proceed to block 515. If not, method 500 may continue to block 525 where the system may send the instant message to the recipient's client.

In block 515, the system may combine the plurality (e.g., N+1) instant messages received from the sender that are directed to the recipient. In one aspect, the system may concatenate the instant messages into a single, consolidated message. In another aspect, the system may semantically process the plurality of instant messages in combine the plurality of instant messages into a consolidated instant message specifying a summary of the content determined from the plurality of instant messages. In block 520, the system may send the consolidated instant message to the recipient's client.

As discussed, the logging and audit services 315 may store a record of received instant messages correlated with the instant message(s) that are sent by the messaging system. As such, the messaging system remains accountable for content alteration and may be monitored for accuracy in the instant message handling and delivery operations performed.

Figure 6:
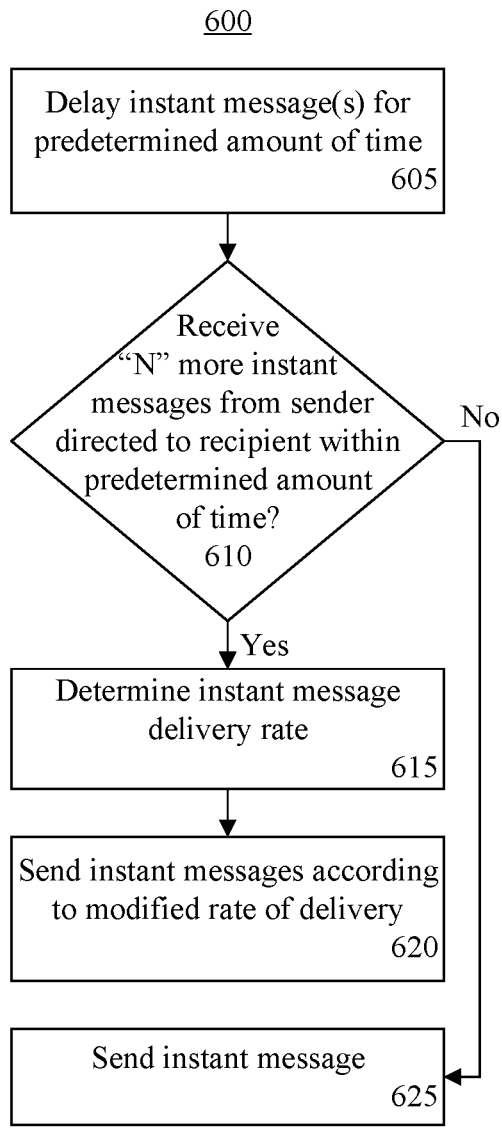
FIG. 6 is a flow chart illustrating another exemplary method of instant message handling and delivery.

FIG. 6 is a flow chart illustrating another exemplary method 600 of instant message handling and delivery. More particularly, method 600 illustrates the implementation of a particular delivery policy as determined by the messaging system. Method 600 illustrates an example where received instant messages may be delayed to determine whether further instant messages directed to a same recipient are received from the same sender. The messages may be sent at a newly determined delivery rate.

In one example, a recipient's user profile may indicate that instant messages received from a particular sender may be delayed for a predetermined amount of time. The predetermined amount of time may be as small as 1, 2, or 3 or more seconds. In another example, the user profile may indicate that instant messages received from a particular sender may be delayed for the predetermined amount of time, but only when the activity level of the recipient's client device is at or above a threshold level. In still another example, the user profile may indicate that instant messages received from a particular sender may be delayed for the predetermined amount of time, but only when the incoming instant messaging rate of the recipient's client device is at or above a threshold rate. In yet another example, the user profile may indicate that instant messages received from a particular sender may be delayed for the predetermined amount of time, but only when the incoming instant messaging rate of the recipient's client device is at or above the threshold rate and/or the activity level of the recipient's client device is at or above the threshold level.

Accordingly, method 600 may begin in a state where the system has received an instant message from a sender directed to a recipient. The system has retrieved the user profile for the recipient and determined that the sender is listed with instant message handling specified therein. The user profile for the recipient further may list one or more of the various thresholds described herein with reference to activity level and/or instant messaging rate for the sender. The system has determined that delaying the received instant message and sending according to another, different delivery rate is the appropriate delivery policy.

In block 605, having received an instant message from a particular sender, the system may delay the instant message for a predetermined amount of time. In block 610, the system determines whether "N" more instant messages from the sender and directed to the recipient have been received within the predetermined amount of time. As noted, "N" may be an integer value of 1 or more. Further, the value of "N" may be specified in the user profile. If the system determines that N more instant messages from the sender to the recipient have been received within the predetermined amount of time, method 600 may proceed to block 615. If not, method 600 may continue to block 625 where the system may send the instant message to the recipient's client.

In block 615, the system may determine an instant message delivery rate, or the delivery rate for sending the plurality (e.g., N+1) of instant messages received from the sender that are directed to the recipient. For example, rather than sending the instant messages in real time as received, the system may send the instant messages with additional time inserted between the sending of each consecutive one of the plurality of instant messages. In illustration, the first instant message may be sent followed by a pause of a predetermined amount of time, followed by the second instant message, followed by a pause of the predetermined amount of time, followed by the third instant message, etc. The amount of time between the first and second instant messages and the amount of time between the second and third instant messages may be different from the amount of time between the instant messages as sent by the sender client and as received by the messaging system. The amount of time may be increased by the system.

In one aspect, the predetermined amount of time used to space the instant messages which determines the delivery rate may be specified by the recipient within the user profile. In another aspect, the amount of time may be adjusted according to the activity level of the recipient's client device and/or the incoming instant messaging rate of the recipient's client device. Larger activity levels and faster incoming instant messaging rates may cause larger spacing between instant messages (e.g., longer predetermined amount of time). Whether the instant messaging delivery rate may be adjusted as described or is static may be specified within the user profile.

In block 620, the system may send the plurality of messages or a combined block of messages to the recipient's client according to the determined instant message delivery rate.

In another aspect, method 600 and the application of a delivery rate may be applied to messages received within a predetermined amount of time across a plurality of different senders, potentially through the grouping of individual senders.

Figure 7:
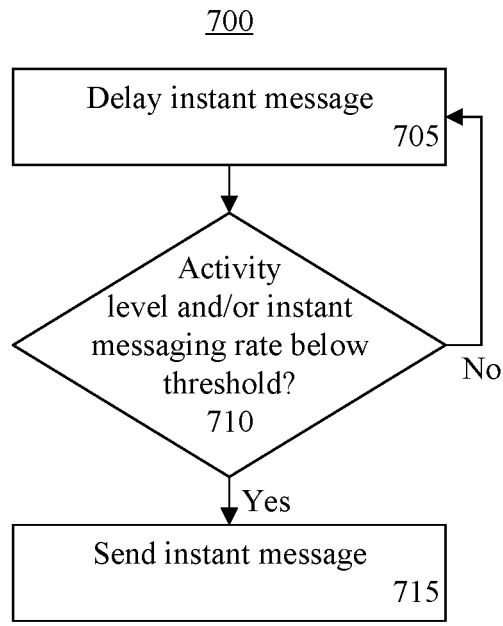
FIG. 7 is a flow chart illustrating another exemplary method of instant message handling and delivery.

FIG. 7 is a flow chart illustrating another exemplary method 700 of instant message handling and delivery. More particularly, method 700 illustrates the implementation of a particular delivery policy as determined by the messaging system. Method 700 illustrates an example where received instant messages may be delayed until a particular condition is met.

Accordingly, method 700 may begin in a state where the system has received an instant message from a sender directed to a recipient. The system has retrieved the user profile for the recipient and determined that the sender is listed with instant message handling and delivery processing specified therein. The user profile for the recipient further may list one or more of the various thresholds described herein with reference to activity level and/or instant messaging rate for the sender. The system has determined that delaying the received instant message is the appropriate delivery policy.

In block 705, having received an instant message from a particular sender, the system may delay the instant message. In block 710, the system may determine whether the activity level and/or the instant messaging rate are below threshold values. Example delivery polices, as specified by rules of the user profile, that may be applied in the example of FIG. 7 are listed below.

- Delay instant message from sender A until activity level of client device falls below activity threshold.
- Delay instant message from sender A until incoming instant messaging rate of client device with respect to sender A falls below threshold.
- Delay instant message from sender A until incoming instant messaging rate of client device, as aggregated across multiple or all senders to the client device, falls below threshold.
- Delay instant message from sender A until activity level of client device falls below activity threshold and incoming instant messaging rate of client device falls below threshold.

Until the condition specified by the delivery policy is met, method 700 may loop back to block 705 and continue delaying the instant message. The system further may delay additional instant messages from the sender that are directed to the recipient until the condition is met. If the condition is met, method 700 may continue to block 715 where the system may send the instant message(s) to the recipient's client.

FIGS. 5-7 illustrate various examples of delivery policies that may be determined and applied when sending instant messages. The inventive arrangements described within this disclosure are not intended to be limited by the examples provided.

In one exemplary use case, a recipient in a work computing environment may be focused on meeting a deadline with many applications open concurrently on the recipient's client. Another user may send an instant message to the recipient. In accordance with the inventive arrangements described herein, the system may intercept the instant message and determine the activity level of the recipient's client to determine the next operation (e.g., per the delivery policy). In this case, the system may determine the importance of the instant message based upon the sender identity.

In one example, the system may not send the instant message immediately to the recipient since the instant message may be considered an interruption based upon the sender and the activity level. In another example, responsive to determining that the importance of the sender is above a particular threshold, the system may send the instant message to the recipient regardless of the activity level of the recipient's client. In one aspect, importance of the sender may be determined from an organizational chart and/or from explicit designation of the sender as important within the user profile of the recipient.

In still another example, the system may determine whether the content of the instant message is of high value from semantic analysis that may be compared with a list of ongoing projects or important subject matter within an organization. The list may be an organization-wide list or maintained by the user in the user profile. If the system determines that the received instant message does not fit any priority patterns, the system may delay the instant message, combine the instant message with one or more others, or manipulate the instant message as described herein. If the system determines that the received instant message does fit a priority pattern, the system may send the instant message to the recipient regardless of the activity level of the recipient's client.

In some cases, the system may simply send instant messages that have been delayed or queued for at least some maximum amount of time or send the content of the instant message by way of another communication channel such as electronic mail to the recipient.

Figure 8:
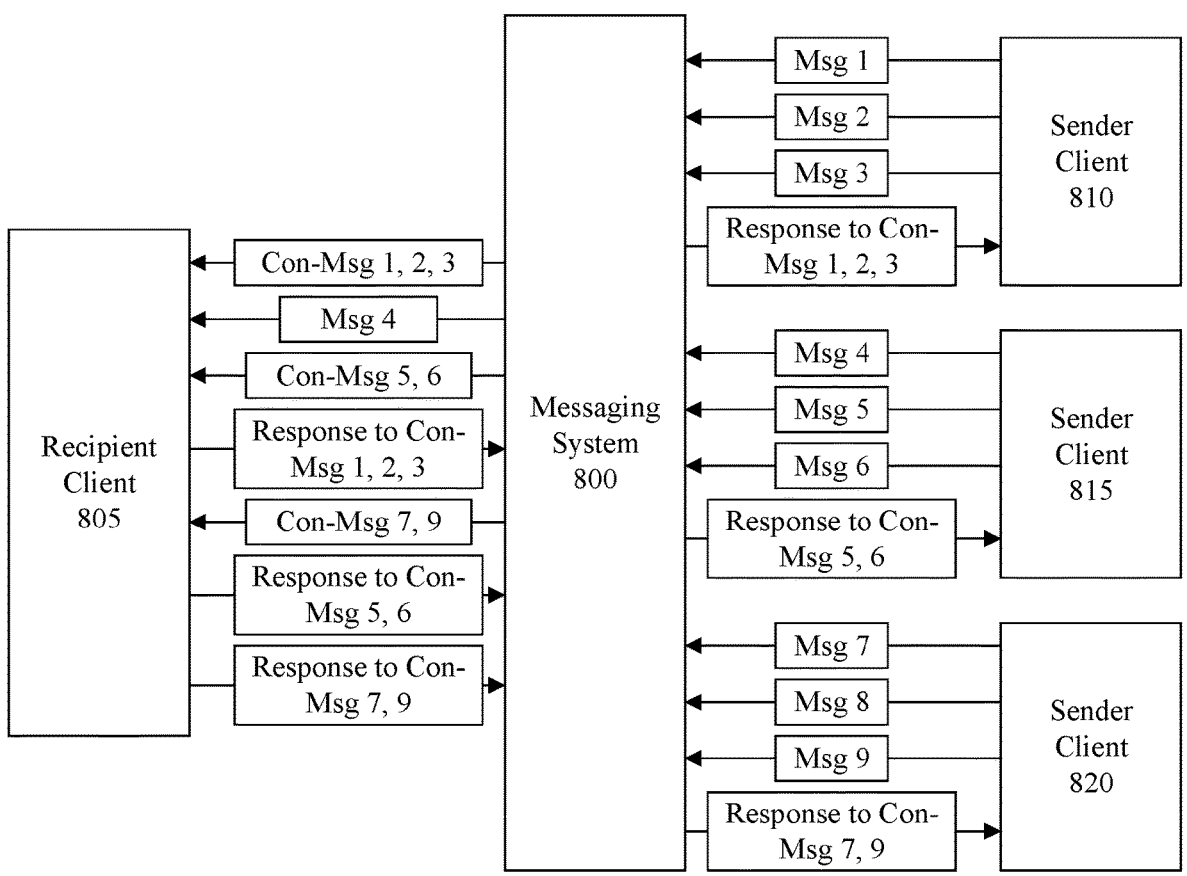
FIG. 8 is a block diagram illustrating another example of instant messaging handling and delivery.

FIG. 8 is a block diagram illustrating exemplary instant message handling and delivery that may be performed by a messaging system as described within this disclosure. As pictured, a messaging system 800 performs instant message handling and delivery between a recipient client 805 and sender clients 810, 815, and 820. FIG. 8 illustrates instant message handling for three different collaborations or conversations.

As shown, a sender client 810, as part of a first collaboration, sends messages (Msg) 1, 2, and 3 to recipient client 805. Messages 1, 2, and 3 may be sent as separate instant messages in rapid succession. Messaging system 800 combines messages 1, 2, and 3 into a single, consolidated instant message shown as "Con-Msg 1, 2, 3", which is sent to recipient client 805. In one aspect, messaging system 800 may consolidate, or combine, message 1, message 2, and message 3 into a single message. Messaging system 800 may combine the instant messages responsive to determining that the user profile of the recipient of client 805 indicates that instant messages from the sender of sender client 810 should be queued and combined into a single consolidated instant message when the instant messages occur within a two minute time period. As a result, the recipient, e.g., recipient client 805, may respond to consolidated message 1, 2, 3 as opposed to the three individual instant messages by sending the single response to consolidated message 1, 2, 3 (Response to Con-Msg 1, 2, 3).

As shown, a sender client 815, as part of a second collaboration, sends messages 4, 5, and 6 to recipient client 805. Messages 4, 5, and 6 may be sent as separate instant messages in rapid succession. Messaging system 800 may pass message 4 through to recipient client 805 and combine messages 5 and 6 into a single, consolidated instant message shown as "Con-Msg 5, 6". In this example, messaging system 800 may combine message 5 and message 6 not based upon timing, but rather based upon content of messages 5 and 6, as interpreted by natural language processing, being same, similar, or related.

A sender client 820, as part of a third collaboration, sends messages 7, 8, and 9 to recipient client 805. Messages 7, 8, and 9 may be sent as separate instant messages in rapid succession. Messing system 800 may drop, or not pass, message 8 and combine messages 7 and 9 into a single, consolidated instant message shown as "Con-Msg 7, 9". In this example, messaging system 800 may combine message 7 and 9 based either upon timing or having same, similar, or related content. Messaging system 800 may drop, i.e., not forward, message 8 responsive to determining that content of message 8 conflicts with, or violates a policy. As noted, the logging and audit service may maintain a record of message 8 and that message 8 was not delivered to recipient client 805.

Figure 9:
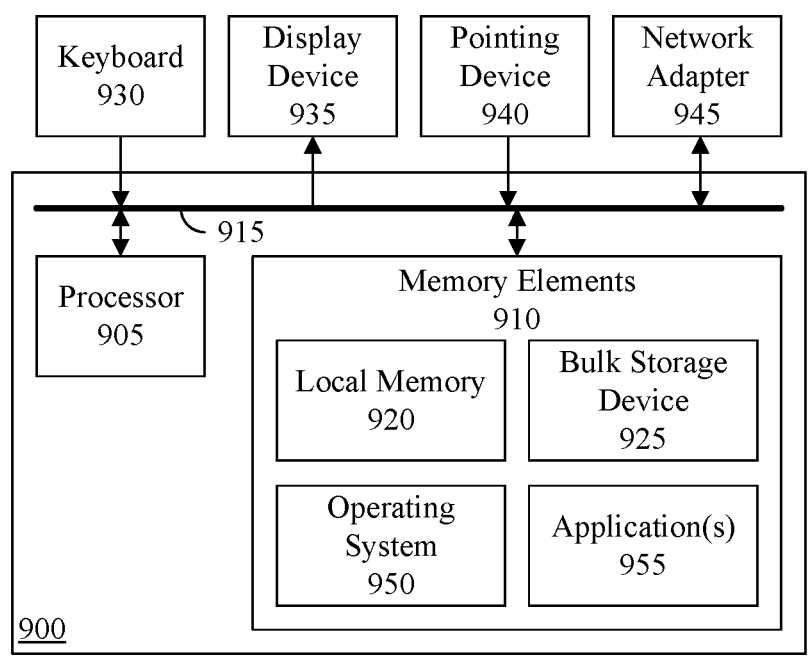
FIG. 9 is a block diagram illustrating an exemplary architecture for a data processing system.

FIG. 9 is a block diagram illustrating an exemplary architecture 900 for a data processing system. Architecture 900 may be used to implement a computer that is suitable for storing and/or executing program code. In one aspect, for example, architecture 900 may be used to implement messaging system 110 of FIG. 1. In another aspect, architecture 900 may be used to implement a client device.

Architecture 900 includes at least one processor 905, e.g., a central processing unit (CPU), coupled to memory elements 910 through a system bus 915 or other suitable circuitry. Architecture 900 stores program code, such as a messaging application and/or a message interception application, within memory elements 910. Processor 905 executes the program code accessed from memory elements 910 via system bus 915. In one aspect, architecture 900 may be used to implement a computer or other data processing system that is suitable for storing and/or executing program code. It should be appreciated, however, that architecture 900 may be used to implement any system including a processor and memory that is capable of performing the functions described within this disclosure.

Memory elements 910 include one or more physical memory devices such as, for example, a local memory 920 and one or more bulk storage devices 925. Local memory 920 may be implemented as a random access memory (RAM) or other non-persistent memory device(s) generally used during actual execution of the program code. Bulk storage device 925 may be implemented as a hard disk drive (HDD), solid state drive (SSD), or other persistent data storage device. Architecture 900 also may include one or more cache memories (not shown) that provide temporary storage of at least some program code in order to reduce the number of times program code must be retrieved from the bulk storage device during execution.

Input/output (I/O) devices such as a keyboard 930, a display device 935, and a pointing device 940 optionally may be coupled to architecture 900. The I/O devices may be coupled to architecture 900 either directly or through intervening I/O controllers. A network adapter 945 may also be coupled to architecture 900 to enable a system implemented using architecture 900 to become coupled to other systems, computer systems, remote printers, remote storage devices, and the like through intervening private or public networks. Modems, cable modems, Ethernet cards, and wireless transceivers are examples of different types of network adapter 945 that may be used with architecture 900.

Memory elements 910 store an operating system 950 and an application 955. Operating system 9500 and one or more application(s) 955 (e.g., messaging application and/or message interception application), being implemented in the form of executable program code, are executed by architecture 900. As such, operating system 950 and/or application 955 may be considered an integrated part of any system implemented using architecture 900. Application 955 and any data items used, generated, and/or operated upon by architecture 900 while executing application 955 are functional data structures that impart functionality when employed as part of architecture 900.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of managing instant message delivery, comprising:
    receiving an instant message directed to a recipient;
    determining, responsive to receiving the instant message, an activity level of a client device of the recipient that includes a list of applications currently executing on the client device of the recipient and a user profile for the recipient that specifies rules for delivering instant messages to the recipient;
    determining, responsive to receiving the instant message, a delivery policy for the instant message according to the user profile of the recipient and the activity level of the client device that includes the list of applications currently executing on the client device of the recipient;
    delaying, for a predetermined period of time and according to the delivery policy, sending the instant message to the client device of the recipient;
    determining a total number of instant messages from a same sender as the instant message sent within the predetermined amount of time;
    combining, responsive to a determination that the total number of instant messages exceeds a predetermined value specified in the user profile, the instant message and other instant messages sent within the predetermined amount of time into a consolidated instant message; and
    sending the consolidated instant message to the client device of the recipient.

2. The method of claim 1, wherein
the sending the instant message to the client device is delayed by the predetermined amount of time.

3. The method of claim 1, wherein
the sending the instant message to the client device is delayed until the activity level of the client device decreases below a threshold.

4. The method of claim 1, wherein
an incoming instant messaging rate for the recipient is determined across a plurality of different senders, and
the delivery policy is further determined according to the incoming instant messaging rate.

5. The method of claim 4, wherein
the sending the instant message to the client device is delayed until the incoming instant messaging rate for the recipient decreases below a threshold.

6. A computer hardware system, comprising:
    a hardware processor configured to initiate the following executable operations:
        receiving an instant message directed to a recipient;
        determining, responsive to receiving the instant message, an activity level of a client device of the recipient that includes a list of applications currently executing on the client device of the recipient and a user profile for the recipient that specifies rules for delivering instant messages to the recipient;
        determining, responsive to receiving the instant message, a delivery policy for the instant message according to the user profile of the recipient and the activity level of the client device that includes the list of applications currently executing on the client device of the recipient;
        delaying, for a predetermined period of time and according to the delivery policy, sending the instant message to the client device of the recipient;
        determining a total number of instant messages from a same sender as the instant message sent within the predetermined amount of time;
        combining, responsive to a determination that the total number of instant messages exceeds a predetermined value specified in the user profile, the instant message and other instant messages sent within the predetermined amount of time into a consolidated instant message; and
        sending the consolidated instant message to the client device of the recipient.

7. The system of claim 6, wherein
the sending the instant message to the client device is delayed by the predetermined amount of time.

8. The system of claim 6, wherein
the sending the instant message to the client device is delayed until the activity level of the client device decreases below a threshold.

9. The system of claim 6, wherein
an incoming instant messaging rate for the recipient is determined across a plurality of different senders, and
the delivery policy is further determined according to the incoming instant messaging rate.

10. The system of claim 9, wherein
the sending the instant message to the client device is delayed until the incoming instant messaging rate for the recipient decreases below a threshold.

11. A computer program product, comprising:
a computer readable storage medium having program code stored therein,
the program code, which when executed by a computer hardware system, causes the computer hardware system to perform:
  receiving an instant message directed to a recipient;
  determining, responsive to receiving the instant message, an activity level of a client device of the recipient that includes a list of applications currently executing on the client device of the recipient and a user profile for the recipient that specifies rules for delivering instant messages to the recipient;
  determining, responsive to receiving the instant message, a delivery policy for the instant message according to the user profile of the recipient and the activity level of the client device that includes the list of applications currently executing on the client device of the recipient;
  delaying, for a predetermined period of time and according to the delivery policy, sending the instant message to the client device of the recipient;
  determining a total number of instant messages from a same sender as the instant message sent within the predetermined amount of time;
  combining, responsive to a determination that the total number of instant messages exceeds a predetermined value specified in the user profile, the instant message and other instant messages sent within the predetermined amount of time into a consolidated instant message; and
  sending the consolidated instant message to the client device of the recipient.

12. The computer program product of claim 10, wherein
the sending the instant message to the client device is delayed by the predetermined amount of time.

13. The computer program product of claim 10, wherein
the sending the instant message to the client device is delayed until the activity level of the client device decreases below a threshold.

14. The computer program product of claim 10, wherein
an incoming instant messaging rate for the recipient is determined across a plurality of different senders, and
the delivery policy is further determined according to the incoming instant messaging rate.

15. The computer program product of claim 14, wherein
the sending the instant message to the client device is delayed until the incoming instant messaging rate for the recipient decreases below a threshold.

* * * * *